United States Patent
Zahdeh (10) Patent No.: US 10,428,863 B2
(45) Date of Patent: Oct. 1, 2019

(54) VARIABLE COMPRESSION RATIO ENGINE

(71) Applicant: GM GLOBAL TECHNOLOGY OPERATIONS LLC, Detroit, MI (US)

(72) Inventor: Akram R. Zahdeh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 15/629,194

(22) Filed: Jun. 21, 2017

(65) Prior Publication Data

US 2018/0372147 A1    Dec. 27, 2018

(51) Int. Cl.
*F16C 7/06* (2006.01)
*F02D 15/02* (2006.01)
*F16C 3/04* (2006.01)
*F16C 3/28* (2006.01)

(52) U.S. Cl.
CPC ............... *F16C 7/06* (2013.01); *F02D 15/02* (2013.01); *F16C 3/04* (2013.01); *F16C 3/28* (2013.01); *F16C 2360/22* (2013.01); *F16C 2361/61* (2013.01); *F16C 2361/71* (2013.01)

(58) Field of Classification Search
CPC ......... F16C 7/06; F16C 2360/22; F02D 15/02
See application file for complete search history.

(56) References Cited

U.S. PATENT DOCUMENTS

| 6,202,623 | B1* | 3/2001 | Ehrlich | F01B 9/02 123/197.4 |
| 2001/0047778 | A1* | 12/2001 | Aoyama | F02B 67/00 123/78 R |
| 2004/0163614 | A1* | 8/2004 | Hiyoshi | F02B 75/045 123/48 B |
| 2005/0268870 | A1* | 12/2005 | Hotta | F02D 15/02 123/78 F |
| 2009/0038588 | A1* | 2/2009 | Hiyoshi | F02B 75/048 123/48 B |

FOREIGN PATENT DOCUMENTS

DE    102005020270 A1    11/2006
DE    102009006633 A1    8/2010

* cited by examiner

*Primary Examiner* — Kevin A Lathers
(74) *Attorney, Agent, or Firm* — Quinn IP Law (57) ABSTRACT

A variable compression ratio (VCR) internal combustion engine having a compression stroke and an expansion stroke includes an engine block defining a cylinder and a cylinder head mounted to the engine block and defining at least a part of a combustion chamber. The VCR engine also includes a reciprocating piston arranged inside the cylinder and configured to compress a mixture of air and fuel and receive a combustion force, wherein the compression stroke of the piston defines a compression ratio of the engine. The VCR engine additionally includes a six-bar linkage mechanism configured to operatively connect the piston to the engine block, articulate on seven distinct parallel axes, decouple the compression stroke from the expansion stroke, and continuously and selectively vary the compression stroke of the piston and the compression ratio of the engine.

16 Claims, 6 Drawing Sheets

VARIABLE COMPRESSION RATIO ENGINE

INTRODUCTION

The present disclosure relates to an internal combustion engine with a variable compression ratio.

An internal combustion engine is a heat engine in which the combustion of a fuel occurs with an oxidizer (typically air) in a combustion chamber that is an integral part of the engine. Internal combustion engines are often employed for powering vehicles, either as a primary power source, or as part of a hybrid powertrain. In a reciprocating internal combustion engine, expansion of the high-temperature and high-pressure gases in a combustion chamber space at the top of the cylinder produced by the combustion applies direct force to the engine's piston. The combustion force applied to the piston subsequently acts through the engine's connecting rod to turn the engine's crankshaft.

A compression ratio is one of the fundamental specifications of an internal combustion engine. An internal combustion engine's compression ratio is a value that represents the ratio of the volume of the engine's combustion chamber from its largest capacity to its smallest capacity. In a reciprocating internal combustion engine the compression ratio is typically defined as the ratio between the volume of the cylinder and combustion chamber when the piston is at the bottom of its stroke, and the volume of the combustion chamber when the piston is at the top of its stroke. An internal combustion engine's compression ratio greatly influences the subject engine's torque output and its fuel efficiency.

SUMMARY

One embodiment of the disclosure is directed to a variable compression ratio (VCR) internal combustion engine configured to operate using compression and expansion strokes. The VCR engine includes an engine block defining a cylinder and a cylinder head mounted to the engine block and defining at least a part of a combustion chamber. The VCR engine also includes a reciprocating piston arranged inside the cylinder and configured to compress a mixture of air and fuel and receive a combustion force, wherein the compression stroke of the piston defines a compression ratio of the engine. The VCR engine additionally includes a six-bar linkage mechanism configured to operatively connect the piston to the engine block and articulate on seven distinct parallel axes. The six-bar linkage mechanism is also configured to decouple the compression stroke from the expansion stroke, and continuously and selectively vary the compression stroke of the piston and the compression ratio of the engine.

The six-bar linkage mechanism may include a primary crankshaft configured to be rotated about a first axis via the combustion force received by the piston. The six-bar linkage mechanism may also include a connecting rod pivotably connected to the piston at a second axis. The six-bar linkage mechanism may additionally include a multi-bar link rotatably connected to the connecting rod at a third axis and to the primary crankshaft at a fourth axis and a control link pivotably connected to the multi-bar link at a fifth axis. The six-bar linkage mechanism may further include a control crankshaft arranged in the engine block, connected to the control link at a sixth axis, and configured to rotate about a seventh axis. The control crankshaft may be further configured such that rotating the control crankshaft regulates the stroke of the piston and thereby continuously varies the compression ratio of the engine.

The VCR engine may also include a phasing device configured to regulate a position of the control crankshaft relative to each of the engine block and the primary crankshaft, and thereby regulate a position of the fifth axis relative to the seventh axis, and of the third axis relative to the first axis.

The phasing device may be configured as a stepper motor.

The engine may also include a torque-transfer mechanism configured to operatively connect the control crankshaft to the primary crankshaft, for synchronized operation therebetween.

The torque-transfer mechanism may define a 2:1 speed ratio for the control crankshaft relative to the primary crankshaft.

The torque-transfer mechanism may be configured as one of a gear-train and a chain.

The torque-transfer mechanism may be configured as the gear-train and result in the primary crankshaft being configured to rotate in an opposite direction relative the control crankshaft.

The torque-transfer mechanism may be configured as the chain. In such an embodiment, the primary crankshaft may be configured to rotate in the same direction as the control crankshaft.

The six-bar linkage mechanism may be additionally configured to lengthen the expansion stroke relative to the compression stroke such that the expansion stroke is greater than the compression stroke.

Another embodiment of the present disclosure is directed to a vehicle employing such a VCR internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
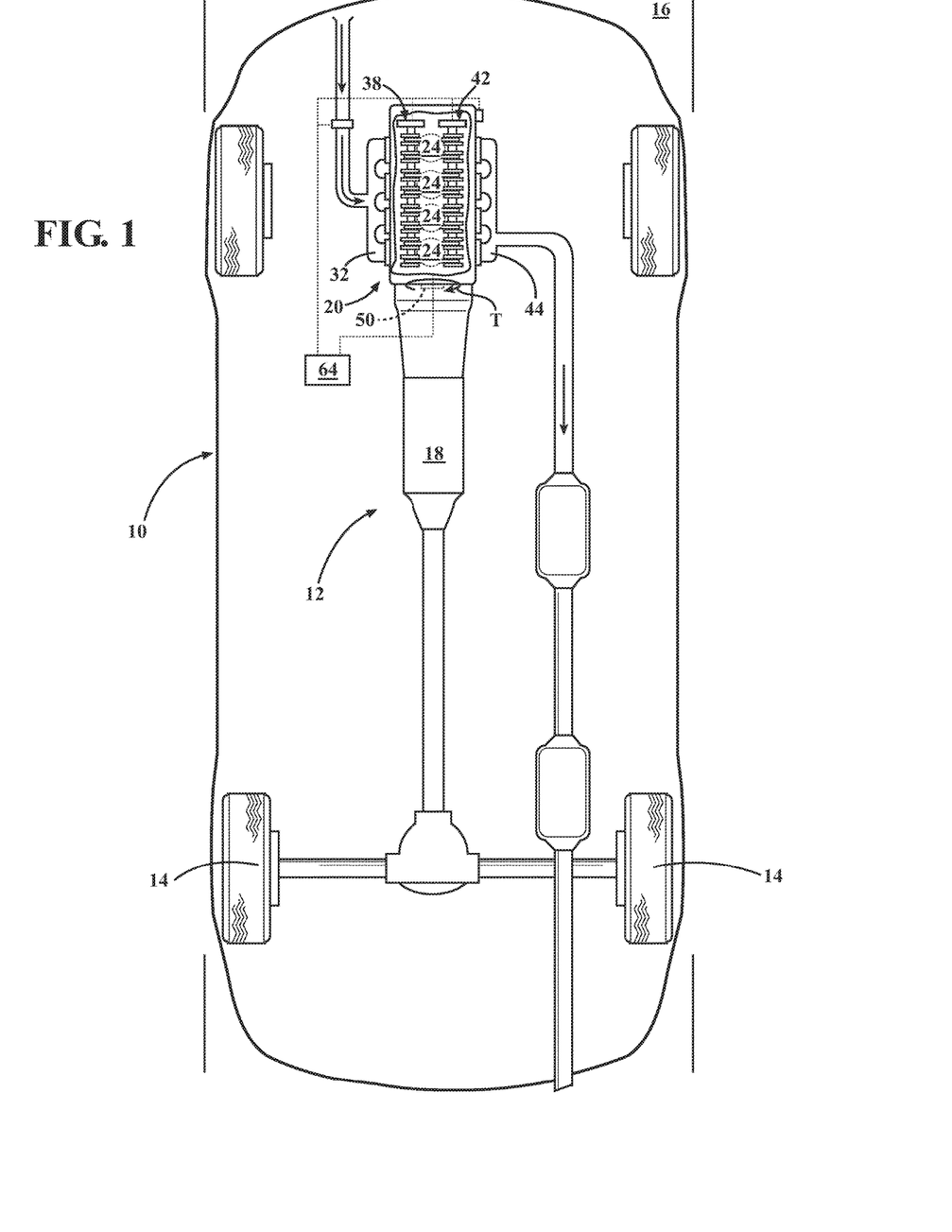
FIG. 1 is a schematic depiction of a vehicle having a variable compression ratio (VCR) engine according to the disclosure.

Referring to the drawings, wherein like reference numbers correspond to like or similar components throughout the several figures, FIG. 1 illustrates a vehicle 10 employing a powertrain 12 for propulsion thereof via driven wheels 14 relative to a road surface 16. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. As shown in FIG. 1, the powertrain 12 includes a transmission assembly 18 operatively connected to an internal combustion engine 20, wherein the engine generates output torque T and the transmission transfers the engine torque to the driven wheels 14.

Figure 2:
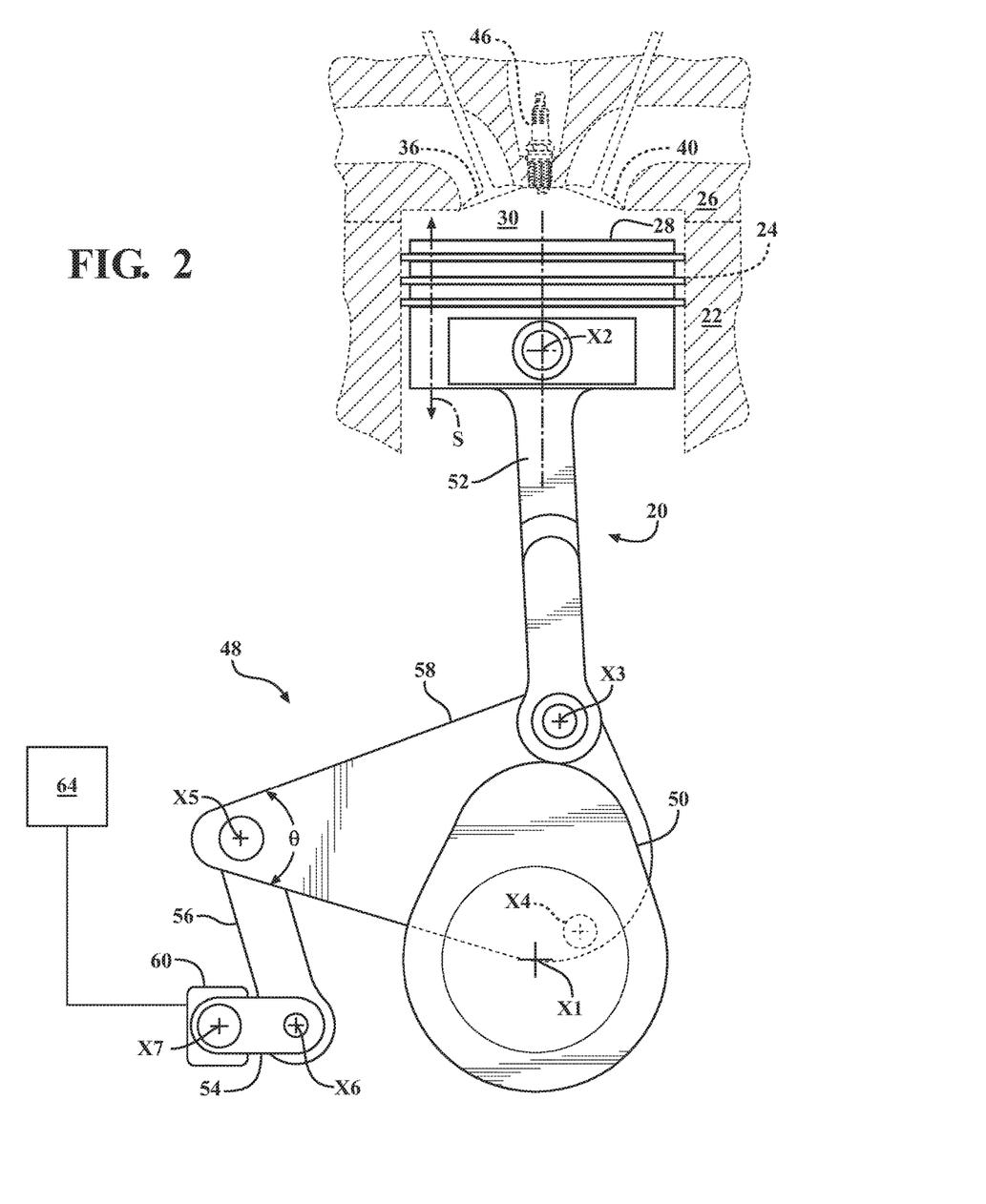
FIG. 2 is a schematic cross-sectional illustration of the engine shown in FIG. 1, the VCR engine having reciprocating piston(s) and a six-bar linkage mechanism including primary and control crankshafts configured to continuously vary the stroke of the piston(s) and the compression ratio of the engine and depicting a phasing device configured to regulate a position of the control crankshaft.
Figure 3:
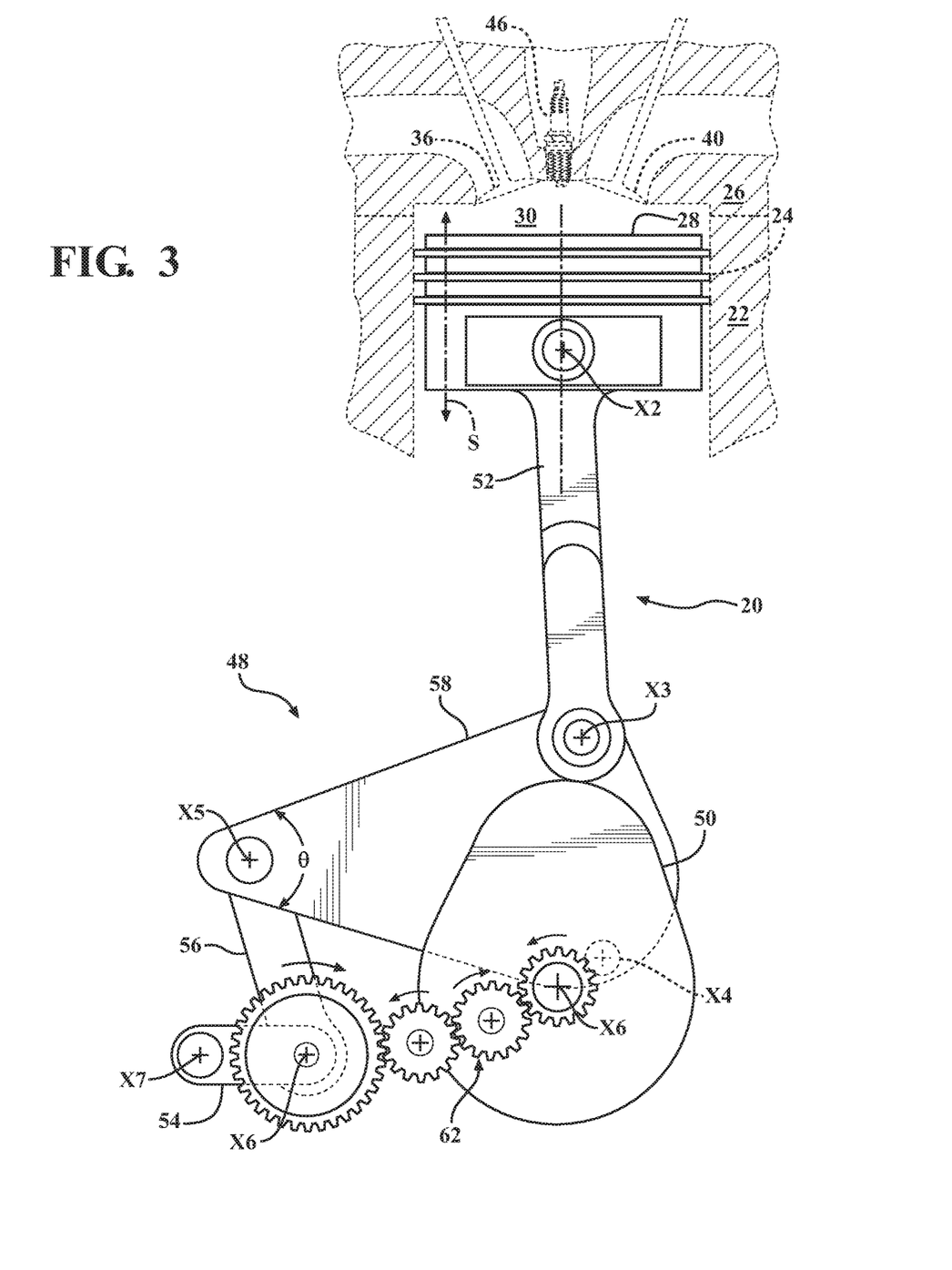
FIG. 3 is a schematic cross-sectional illustration of the VCR engine shown in FIG. 1, and depicting a torque-transfer mechanism configured to operatively connect the control crankshaft to the primary crankshaft, according to one embodiment of the disclosure.
Figure 4:
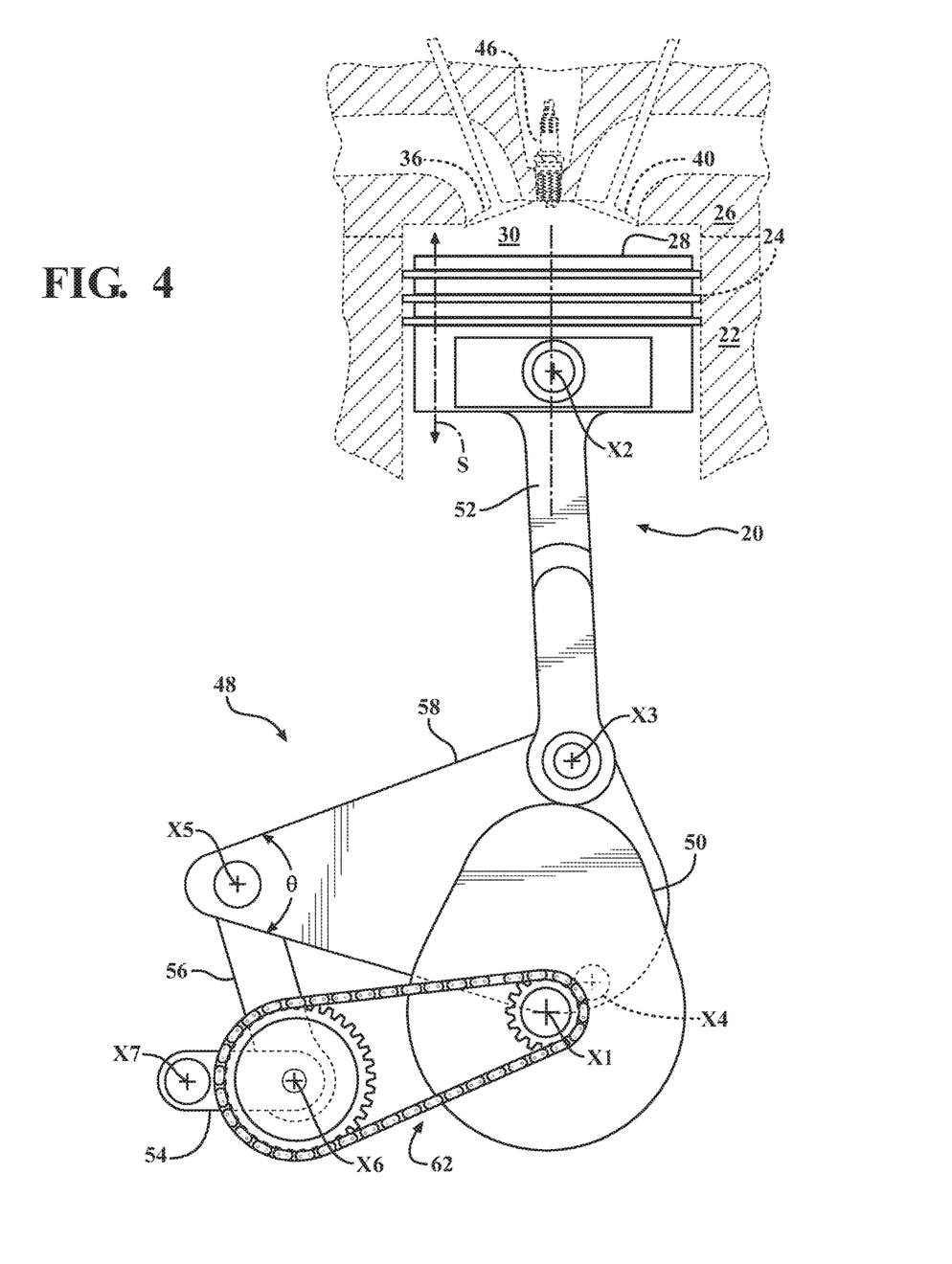
FIG. 4 is a schematic cross-sectional illustration of the VCR engine shown in FIG. 1, and depicting a torque-transfer mechanism configured to operatively connect the control crankshaft to the primary crankshaft, according to another embodiment of the disclosure.

The internal combustion engine 20 may be configured as a spark- or compression-ignition type, as understood in the art. The engine 20 may be configured as a 4-stroke engine. Accordingly, operation of the engine 20 may define individual and separate intake stroke, expansion stroke, compression stroke, and exhaust stroke. During such 4-stroke operation, the engine 20 typically requires 720 degrees or two complete revolutions to complete a single combustion cycle. As shown in FIGS. 2-4, the engine 20 includes an engine block 22. The engine block defines cylinders 24, each arranged along a respective cylinder centerline CL. A cylinder head 26 is mounted, such as fastened, to the engine block 22. In the alternative, the cylinder head 26 may be integrated into or cast together with the engine block 22 (not shown). The cylinder head 26 receives air and fuel as a pre-combustion charge to be used inside the cylinders 24 for subsequent combustion.

As may be seen in FIGS. 2-4, each cylinder 24 includes a respective power-generating piston 28 configured to reciprocate therein. Additionally, combustion chambers 30 are formed within the cylinders 24 between the bottom surface of the cylinder head 26 and the tops of the pistons 28. Accordingly, the cylinder head 26 defines at least a part of the combustion chambers 30. A stroke S of the piston(s) 28 defines a compression ratio CR of the engine 20. In other words, the compression ratio CR of the engine 20 is the ratio between the volume of the cylinder 24 and the combustion chamber 30 when the piston 28 is at the bottom of its stroke S, and the volume of the combustion chamber 30 when the piston is at the top of its stroke.

A flow of air from the ambient is directed through an intake manifold 32 to each of the combustion chambers 30. Ambient air is combined either in the intake manifold 32 or inside the combustion chambers 30 with an appropriately metered amount of fuel to form a fuel-air mixture for subsequent combustion inside the subject combustion chamber. Also, an intake air compressor device, such as a turbocharger or a supercharger (not shown), may be employed to increase pressure of the ambient air charge to enhance output engine torque T. Although an in-line four-cylinder engine is shown in FIGS. 1-2, nothing precludes the present disclosure from being applied to an engine having a different number and/or arrangement of cylinders.

As shown on FIGS. 2-4, the engine 20 also includes one or more intake valves 36 operatively connected to the cylinder head 26 and configured to control a supply of intake air to each cylinder 24 for combustion with fuel therein. An intake camshaft 38 may be employed to regulate opening and closing of the respective intake valve(s) 36 during operation of the engine 20. The engine 20 additionally includes one or more exhaust valves 40 operatively connected to the cylinder head 26 and configured to control removal of post-combustion gasses from each cylinder 24. An exhaust camshaft 42 may be employed to regulate opening and closing of the respective exhaust valves 40 during operation of the engine 20.

The cylinder head 26 is also configured to exhaust post-combustion gasses from the combustion chambers 30, such as via an exhaust manifold 44. As shown in FIGS. 2-4, the engine 20 may employ spark plugs 46, i.e., at least a part of each spark plug may be arranged inside a respective combustion chamber 30 and configured to ignite the mixture of air and fuel for initiating combustion thereof. Specifically, there may be a plurality, for example two, spark plugs 46 employed by each respective combustion chamber 30. If the engine 20 is configured as a compression-ignition type, the cylinders 24 may be devoid of such spark plugs, since the combustion of the fuel-air mixture may be initiated solely via compression thereof.

The engine 20 also includes a six-bar linkage mechanism 48 configured to operatively connect the piston 28 to the engine block 22 and articulate on seven distinct parallel axes that will be described in detail below. The six-bar linkage mechanism 48 may also be employed to decouple the compression stroke of the engine 20 from its expansion stroke, i.e., such that the length of the compression stroke does not establish or have to be identical to the length of the expansion stroke. As a result, and as will be described in detail below, each of the expansion and compression strokes of the engine 20 may be regulated individually, and without influencing the duration of the other. The six-bar linkage mechanism 48 is also configured to continuously and selectively vary the compression stroke and the expansion stroke of the piston(s) 28, to thereby vary a volume of the combustion chamber(s) 20 and the compression ratio CR of the engine 20.

As shown, the six-bar linkage mechanism 48 may include a primary crankshaft 50 rotatably mounted to the engine block 22. The primary crankshaft 50 is configured to be rotated within the engine block 22 about a first axis X1 via the combustion force received by the piston(s) 28 and output the engine torque T, such as to the transmission 18. The six-bar linkage mechanism 48 may also include a connecting rod 52 pivotably connected to the piston 28 at a second axis X2. The six-bar linkage mechanism 48 may additionally include a multi-bar link 54 rotatably connected to the connecting rod 52 at a third axis X3 and to the primary crankshaft 50 at a fourth axis X4. Specifically, the multi-bar link 54 is shown as a generally triangular structure defining a unified twin-link member, such that the motion of the two links is fully synchronized. In the embodiment shown, an included angle θ of the triangular multi-bar link 54 is configured to define the spacial relationship between the first, third, and fifth axes X1, X3, X5, and, in part, an available range of adjustment for the stroke S of the piston(s) 28.

The six-bar linkage mechanism 48 may also include a control link 56 pivotally connected to the multi-bar link 54 at a fifth axis X5. The six-bar linkage mechanism 48 may further include a control crankshaft 58 arranged in the engine block 22, connected to the control link 56 at a sixth axis X6, and configured to rotate about a seventh axis X7. The lengths of the control link 56 and the control crankshaft 58 are additional factors influencing the available range of adjustment for the stroke S of the piston(s) 28. As a result, the control crankshaft 58 may be configured such that adjusting, via rotating or repositioning, the control crankshaft relative to the engine block 22 regulates the stroke S of the piston(s) 28.

Effectively, the six-bar linkage mechanism 48 enables the adjustment of either one or both of the top dead center and bottom dead center positions of the piston 28 along its stroke S. Accordingly, continuous adjustment of the position of control crankshaft 58 may be used to continuously vary the compression stroke and the compression ratio CR of the engine 20. Furthermore, rotating or repositioning the control crankshaft 58 may also be used to control, either vary or maintain, the expansion stroke of the piston(s) 28. As a result, the six-bar linkage mechanism 48 may be configured to lengthen the expansion stroke relative to the compression stroke of the piston(s) 28, such that the expansion stroke becomes greater than the compression stroke. Such a relatively greater expansion stroke, as compared to the compression stroke, is intended to enhance efficiency of the engine 20 by operating the engine on the Atkinson cycle.

In the traditional Atkinson cycle, the effective compression ratio is reduced relative to the expansion ratio, as opposed to traditional Otto and Diesel cycles where the expansion ratio and the compression ratio are equal. The greater expansion ratio allows more work to be extracted from the combustion gases as the gases are expanded to nearly atmospheric pressure. The shortened compression stroke, as compared to the expansion stroke, allows the combustion gases to be expanded to atmospheric pressure, thereby potentially increasing operating efficiency of the engine. As such, it is typically the Atkinson cycle's greater efficiency that fosters its use in internal combustion engines. Additionally, in compression-ignition engines, Atkinson cycle may help reduce emissions of Nitrogen Oxides (NOx) and increase engine efficiency, especially at higher engine loads.

While the difference between the intake and compression ratios in the Atkinson cycle results in enhanced thermal efficiency at low engine speeds and loads, the same difference generally compromises power density at high engine loads. Some engines employing the Atkinson cycle are specifically equipped with turbochargers to offset the compromise in power density. Furthermore, an Atkinson cycle enabled engine with VCR is capable of overcoming such power limitations. The VCR enables operation of the spark-ignition engine using an elevated compression ratio during low engine speeds and loads to maximize thermal efficiency, while a reduced compression ratio may be used at high engine speeds and loads to achieve increased power and acceptable fuel efficiency.

In a particular embodiment of the engine 20 shown in FIG. 2, rotation the primary crankshaft 50 and the control crankshaft 58 may be unsynchronized, thus permitting operational variation or phasing between positioning of the primary crankshaft and the control crankshaft. As shown in FIG. 2, in such an embodiment, the engine 20 may include a phasing device 60 configured to shift a position of the control crankshaft 58 relative to the engine block 22 and to the primary crankshaft 50, and thereby regulate a position of the fifth axis X5 relative to the seventh axis X7, and of the third axis X3 relative to the first axis X1. The subject regulation of position of the control crankshaft 58 via the phasing device 60 may be employed to achieve 4-stroke operation over one complete engine revolution, or within 360 degrees of operation of the engine 20. Accordingly, employing the phasing device 60 as shown in FIG. 2 permits the 4-stroke engine 20 to achieve power density of a 2-stroke cycle. Specifically, the phasing device 60 may be configured as a stepper motor to regulate the position of the control crankshaft 58 relative to the primary crankshaft 50. The phasing device 60 may be mounted to the engine block 22, on the side of the primary crankshaft 50 (as shown in FIG. 2), or below the primary crankshaft (not shown), such as inside a crankcase of the engine 20.

In a separate embodiment of the engine 20 shown in FIG. 3-4, rotation of the primary crankshaft 50 and the control crankshaft 58 may be synchronized. In such an embodiment, the engine 20 may include a torque-transfer mechanism 62 configured to operatively connect the control crankshaft 58 to the primary crankshaft 50, for synchronized operation therebetween. The torque-transfer mechanism 62 may be configured as a gear-train (shown in FIG. 3) or a chain engaging respective sprockets on the primary and control crankshafts 50, 58 (shown in FIG. 4). In the embodiment of FIG. 3, the primary crankshaft 50 is configured to rotate in an opposite direction relative to the control crankshaft 58. In the alternative embodiment of FIG. 4, the primary crankshaft 50 and the control crankshaft 58 are configured to rotate in the same direction. In each of FIGS. 3 and 4, the torque-transfer mechanism 62 defines a 2:1 speed ratio for the control crankshaft 58 relative to the primary crankshaft 50. The subject regulation of position of the control crankshaft 58 via the torque-transfer mechanism 62 achieves power density of a conventional 4-stroke engine over 720 degrees of engine 20 operation.

As shown in FIGS. 1 and 2, the vehicle 10 may additionally include an electronic controller 64. The controller 64 may be an electronic control module (ECM) or a powertrain controller, for example, configured to regulate operation of the powertrain 12, and specifically the engine 20. The controller 64 includes a memory, at least some of which is tangible and non-transitory. The memory may be a recordable medium that participates in providing computer-readable data or process instructions. Such a medium may take many forms, including but not limited to non-volatile media and volatile media. Non-volatile media for the controller 64 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 64 may also include a flexible disk or a hard disk, magnetic tape, other magnetic medium, a CD-ROM, DVD, other optical medium, etc. The controller 64 may be configured or equipped with other required computer hardware, such as an internal high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 64 or accessible thereby may be stored in the memory and automatically executed to provide the required functionality. Specifically, the controller 64 may be programmed to regulate the phasing device 60 to adjust the position of the control crankshaft 58 and thus the position of fifth axis X5 relative to the seventh axis X7, and of the third axis X3 relative to the first axis X1. Accordingly, the controller 64 may be programmed to actively control the expansion stroke relative to the compression stroke of the piston(s) 28.

As noted above, typically, high engine load at low engine speed results in elevated pressure inside the combustion chambers 30, thereby increasing the likelihood of knock or auto ignition due to uncontrolled combustion. Therefore, at lower engine speeds, increasing the volume of the combustion chamber 30 by decreasing the stroke S via the six-bar linkage mechanism 48, reduces the pre-combustion pressures inside the particular cylinder 24, and reduces the likelihood of knock. On the other hand, at higher engine speeds, reducing the volume of the combustion chamber 30 by increasing the stroke S via the six-bar linkage mechanism 48, increases the compression ratio of the particular cylinder 24 and permits the cylinder to generate higher peak cylinder pressures and develop increased power.

Figure 5:
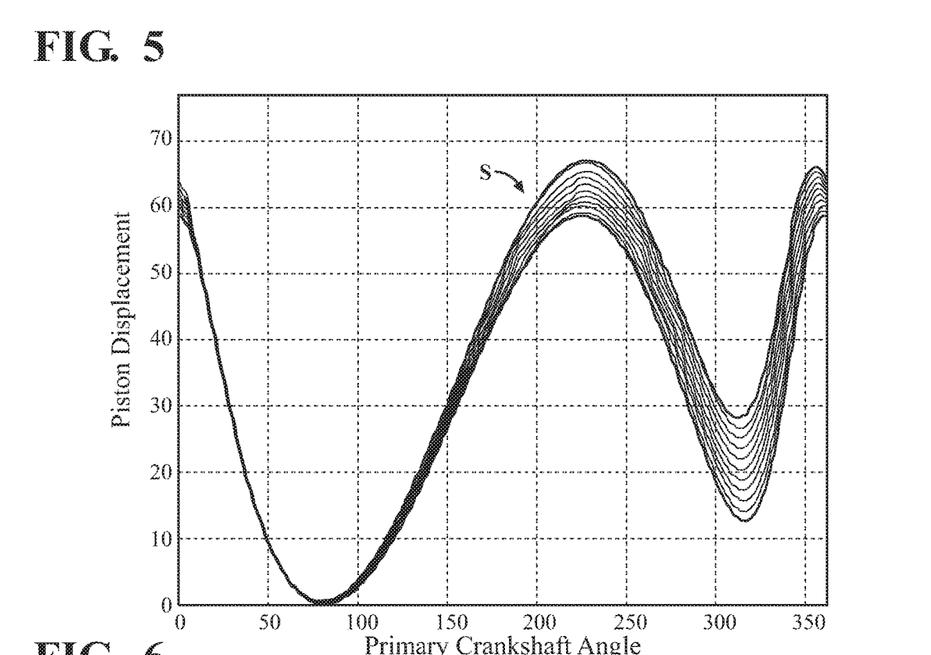
FIG. 5 is a graphical illustration of a variation in displacement of the piston versus rotational angle of the primary crankshaft enabled by the six-bar linkage mechanism for the VCR engine shown in FIG. 2.
Figure 6:
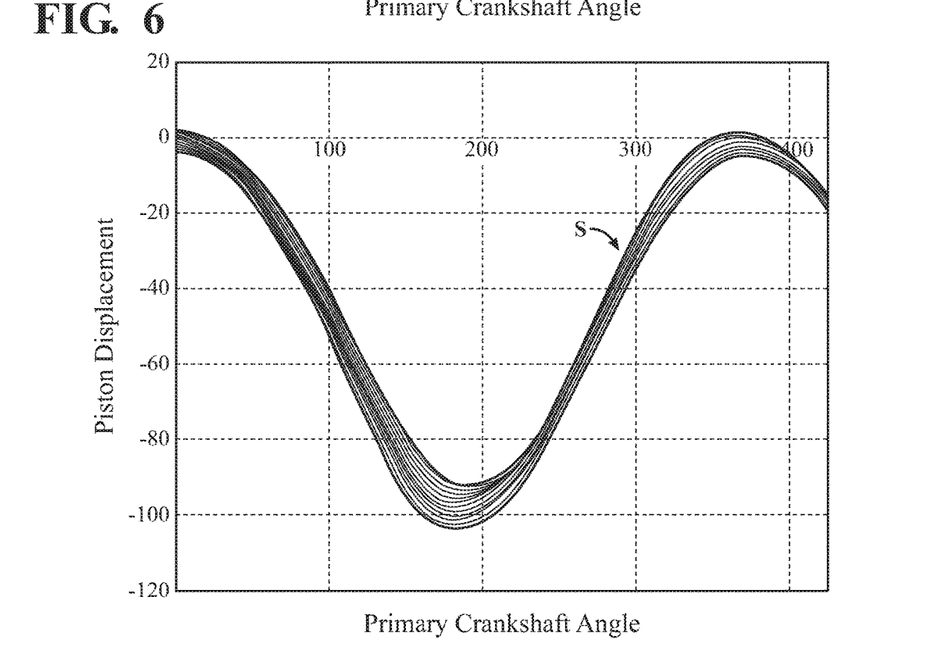
FIG. 6 is a graphical illustration of a variation in displacement of the piston versus rotational angle of the primary crankshaft enabled by the six-bar linkage mechanism for the VCR engine shown in FIGS. 3-4.

As a result of the regulation of the stroke S using the six-bar linkage mechanism 48, the combustion pressures inside the combustion chamber 30 may be effectively managed via VCR during certain engine operating modes. As shown in FIG. 5, the stroke S operated by the six-bar linkage mechanism 48 may be controlled to vary a displacement of the piston 28 versus rotational angle of the primary crankshaft 50 enabled by the six-bar linkage mechanism 48 by the embodiment of the six-bar linkage mechanism shown in FIG. 2. As shown in FIG. 6, the stroke S operated by the six-bar linkage mechanism 48 may be controlled to vary a displacement of the piston 28 versus rotational angle of the primary crankshaft 50 enabled by the six-bar linkage mechanism 48 by the embodiment of the six-bar linkage mechanism shown in FIGS. 3-4. In each of FIGS. 5 and 6, the varied displacement of the piston 28 is graphically illustrated by multiple overlaid sinusoidal plots of the piston stoke S.

Figure 7:
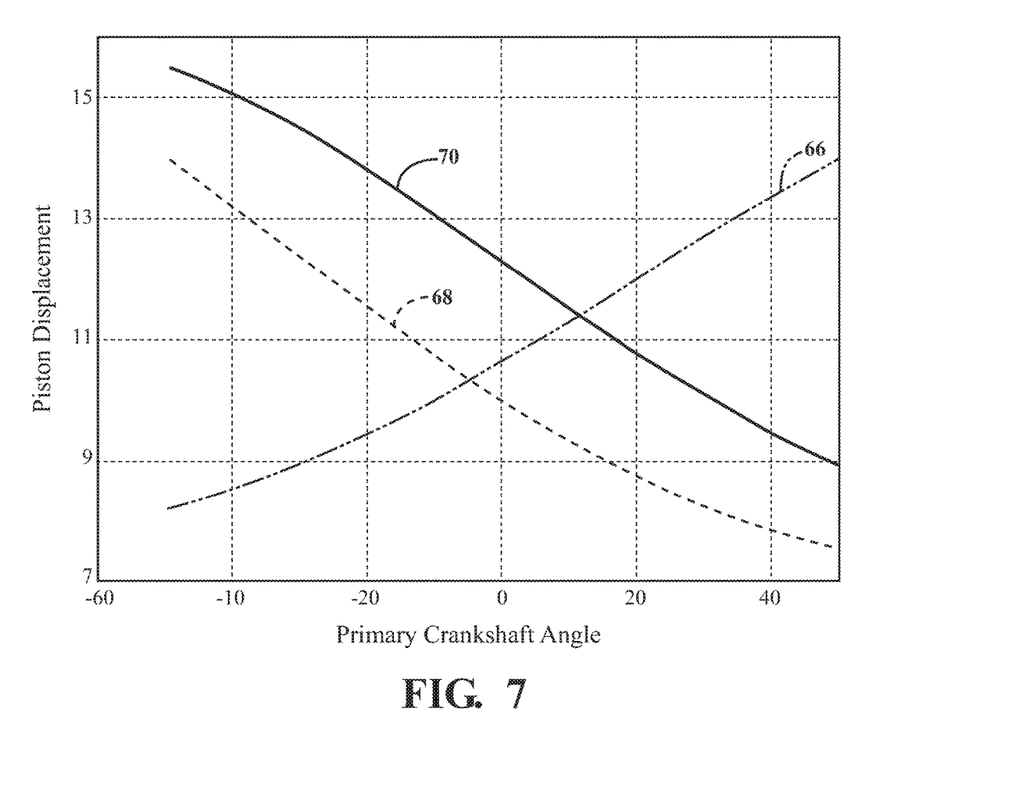
FIG. 7 is a graphical illustration of compression ratio and expansion ratio change as a function of control shaft position enabled by the six-bar linkage mechanism.

FIG. 7 graphically depicts variation of displacement of the piston 28 during the compression stroke and the resultant effect on the compression ratio CR, as well as the variation of displacement of the piston 28 during in the expansion stroke of the engine 20. As shown, the variation in displacement of the piston 28 versus a rotational angle 66 of the primary crankshaft 50 may be employed to generate an increased compression ratio 68 in combination with an increased expansion ratio 70 of the Atkinson cycle operation for enhanced fuel efficiency of the engine 20 at lower engine speeds. Additionally, the six-bar linkage mechanism 48 may be regulated by the controller 64 to reduce the compression ratio CR at higher engine speeds and thereby enhance the engine's power output.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A variable compression ratio (VCR) internal combustion engine having a compression stroke and an expansion stroke, the engine comprising:
   an engine block defining a cylinder;
   a cylinder head mounted to the engine block and defining at least a part of a combustion chamber;
   a reciprocating piston arranged inside the cylinder and configured to compress a mixture of air and fuel and receive a combustion force, wherein the compression stroke of the piston defines a compression ratio of the engine;
   a six-bar linkage mechanism configured to operatively connect the piston to the engine block, articulate on seven distinct parallel axes, decouple the compression stroke from the expansion stroke, and continuously and selectively vary the compression stroke of the piston and the compression ratio of the engine;
   wherein the six-bar linkage mechanism includes:
      a primary crankshaft configured to be rotated about a first axis via the combustion force received by the piston;
      a connecting rod pivotably connected to the piston at a second axis;
      a multi-bar link rotatably connected to the connecting rod at a third axis and to the primary crankshaft at a fourth axis;
      a control link pivotably connected to the multi-bar link at a fifth axis; and
      a control crankshaft arranged in the engine block, connected to the control link at a sixth axis, and configured to rotate about a seventh axis, such that rotating the control crankshaft regulates the stroke of the piston and thereby continuously varies the compression ratio of the engine; and
   a torque-transfer mechanism configured to operatively connect the control crankshaft to the primary crankshaft, for synchronized operation therebetween.

2. The engine of claim 1, further comprising a phasing device configured to regulate a position of the control crankshaft relative to each of the engine block and the primary crankshaft, and thereby regulate a position of the fifth axis relative to the seventh axis, and of the third axis relative to the first axis.

3. The engine of claim 2, wherein the phasing device is configured as a stepper motor.

4. The engine of claim 1, wherein the torque-transfer mechanism defines a 2:1 speed ratio for the control crankshaft relative to the primary crankshaft.

5. The engine of claim 1, wherein the torque-transfer mechanism is configured as one of a gear-train and a chain.

6. The engine of claim 5, wherein the torque-transfer mechanism is configured as the gear-train, and the primary crankshaft is configured to rotate in an opposite direction relative the control crankshaft.

7. The engine of claim 5, wherein the torque-transfer mechanism is configured as the chain, and the primary crankshaft and the control crankshaft are configured to rotate in the same direction.

8. The engine of claim 1, wherein the six-bar linkage mechanism is additionally configured to lengthen the expansion stroke relative to the compression stroke such that the expansion stroke is greater than the compression stroke.

9. A vehicle comprising:
a road wheel; and
a variable compression ratio (VCR) internal combustion engine having a compression stroke and an expansion stroke and configured to generate torque for driving the road wheel, the engine having:
  an engine block defining a cylinder;
  a cylinder head mounted to the engine block and defining at least a part of a combustion chamber;
  a reciprocating piston arranged inside the cylinder and configured to compress a mixture of air and fuel and receive a combustion force, wherein the compression stroke of the piston defines a compression ratio of the engine;
  a six-bar linkage mechanism configured to operatively connect the piston to the engine block, articulate on seven distinct parallel axes, decouple the compression stroke from the expansion stroke, and continuously and selectively vary the compression stroke and the expansion stroke of the piston and the compression ratio of the engine;
  wherein the six-bar linkage mechanism includes:
    a primary crankshaft configured to be rotated about a first axis via the combustion force received by the piston;
    a connecting rod pivotably connected to the piston at a second axis;
    a multi-bar link rotatably connected to the connecting rod at a third axis and to the primary crankshaft at a fourth axis;
    a control link pivotably connected to the multi-bar link at a fifth axis; and
    a control crankshaft arranged in the engine block, connected to the control link at a sixth axis, and configured to rotate about a seventh axis, such that rotating the control crankshaft regulates the stroke of the piston and thereby continuously varies the compression ratio of the engine; and
    a torque-transfer mechanism configured to operatively connect the control crankshaft to the primary crankshaft, for synchronized operation therebetween.

10. The vehicle of claim 9, wherein the engine additionally includes a phasing device configured to regulate a position of the control crankshaft relative to each of the engine block and the primary crankshaft, and thereby regulate a position of the fifth axis relative to the seventh axis, and of the third axis relative to the first axis.

11. The vehicle of claim 10, wherein the phasing device is configured as a stepper motor.

12. The vehicle of claim 9, wherein the torque-transfer mechanism defines a 2:1 speed ratio for the control crankshaft relative to the primary crankshaft.

13. The vehicle of claim 9, wherein the torque-transfer mechanism is configured as one of a gear-train and a chain.

14. The vehicle of claim 13, wherein the torque-transfer mechanism is configured as the gear-train, and the primary crankshaft is configured to rotate in an opposite direction relative the control crankshaft.

15. The vehicle of claim 13, wherein the torque-transfer mechanism is configured as the chain, and the primary crankshaft and the control crankshaft are configured to rotate in the same direction.

16. The vehicle of claim 9, wherein the six-bar linkage mechanism is additionally configured to lengthen the expansion stroke relative to the compression stroke such that the expansion stroke is greater than the compression stroke.

\* \* \* \* \*